US011441701B2

(12) United States Patent
Olbrich et al.

(10) Patent No.: US 11,441,701 B2
(45) Date of Patent: Sep. 13, 2022

(54) MICROFLUIDIC VALVE

(71) Applicant: HEWLETT-PACKARD DEVELOPMENT COMPANY, L.P., Spring, TX (US)

(72) Inventors: Craig Olbrich, Corvallis, OR (US); Alexander N. Govyadinov, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 230 days.

(21) Appl. No.: 16/621,470

(22) PCT Filed: Jul. 14, 2017

(86) PCT No.: PCT/US2017/042270
§ 371 (c)(1),
(2) Date: Dec. 11, 2019

(87) PCT Pub. No.: WO2019/013825
PCT Pub. Date: Jan. 17, 2019

(65) Prior Publication Data
US 2020/0173581 A1 Jun. 4, 2020

(51) Int. Cl.
*F16K 99/00* (2006.01)
(52) U.S. Cl.
CPC ...... *F16K 99/0019* (2013.01); *F16K 99/0036* (2013.01); *F16K 2099/0084* (2013.01); *F16K 2099/0086* (2013.01)

(58) Field of Classification Search
CPC ............. F16K 99/0019; F16K 99/0036; F16K 2099/0084; F16K 2099/0086
See application file for complete search history.

(56) References Cited

U.S. PATENT DOCUMENTS 6,444,106 B1 9/2002 Mcbride
6,655,924 B2 * 12/2003 Ma .......................... F04B 19/24
417/209

(Continued)

FOREIGN PATENT DOCUMENTS

CN 105940249 9/2016
TW 200410896 7/2004

(Continued)

OTHER PUBLICATIONS

Hagmeyer, B. et al., "Towards Plug and Play Filing of Microfluidic Devices By Utilizing Networks of Capillary Stop Valves", Sep. 2014, <https://www.ncbi.nlm.nih.gov/pmc/articles/PMC-4192738/>.

*Primary Examiner* — Daphne M Barry
(74) *Attorney, Agent, or Firm* — Fabian VanCott (57) ABSTRACT

A microfluidic valve may include a firing chamber having an orifice, a first portion of a liquid conduit connected to the firing chamber at a first port, a second portion of the liquid conduit connected to the firing chamber at a second port and a thermal resistor. The thermal resistor is to form a bubble within the firing chamber to expel liquid from the firing chamber through the orifice such that a first meniscus forms across the first port and a second meniscus forms across the second port to interrupt liquid flow between the first portion and the second portion of the liquid conduit.

20 Claims, 5 Drawing Sheets

(56) References Cited

U.S. PATENT DOCUMENTS

| | | | |
|---|---|---|---|
| 6,869,273 B2 * | 3/2005 | Crivelli | B01F 5/0415 |
| | | | 137/828 |
| 8,651,624 B2 | 2/2014 | Pan | |
| 8,840,981 B2 | 9/2014 | Sieber | |
| 2004/0028566 A1 | 2/2004 | Ko | |
| 2004/0206408 A1 | 10/2004 | Peters | |
| 2006/0249387 A1 | 11/2006 | Willms | |
| 2007/0081052 A1 | 4/2007 | Lebron | |
| 2007/0098600 A1 * | 5/2007 | Kayyem | G01N 33/54386 |
| | | | 422/400 |
| 2008/0186801 A1 * | 8/2008 | Liu | B01F 13/0059 |
| | | | 366/132 |
| 2015/0238961 A1 | 8/2015 | Vrouwe | |
| 2016/0303564 A1 | 10/2016 | Gilbert | |
| 2017/0159847 A1 | 6/2017 | Alexeenko | |

FOREIGN PATENT DOCUMENTS

| | | |
|---|---|---|
| TW | 201209405 | 3/2012 |
| TW | 201213798 | 4/2012 |

\* cited by examiner

MICROFLUIDIC VALVE

BACKGROUND

Microfluidics technology has found many applications in the biomedical field, cell biology, protein crystallization, molecular diagnostics, nucleic acids amplification, gene sequencing and other areas. Such microfluidic technology may include microfluidic valves that control the passage of liquid through a conduit. The scale of microfluidics presents many design challenges with respect to such microfluidic valves.

DETAILED DESCRIPTION OF EXAMPLES

Many microfluidic devices utilize valves that are miniaturized versions of macro-fluidic valves. As such, many existing microfluidic valves employ moving parts such as flexible flaps, membranes, free-flowing solid plugs and liquid discs. Such microfluidic valves are often unreliable and difficult to fabricate.

Disclosed herein are various example microfluidic valves that avoid much of the reliability issues and fabrication complexities found in many existing microfluidic valves. The disclosed microfluidic valves each comprise a firing chamber having an orifice and connected to two portions of liquid conduit by two respective ports. The disclosed microfluidic valves each further comprise a thermal resistor to close the valve. The thermal resistor generates a bubble in a firing chamber that is sufficiently large such that liquid in the firing chamber is sufficiently expelled to break any continuous string or stream of liquid extending through or across the firing chamber from one port to another port. The ports are sized such that menisci form across each of the ports upon collapse of the bubble. The menisci inhibit liquid from flowing back into the firing chamber, maintaining the capillary break, the interruption of liquid flow through the firing chamber, and maintaining the valve in a closed state.

In some implementations, the valve is actuatable to an open state by a meniscus breaker that breaks the menisci extending across the ports. Breaking of the menisci across the ports allows liquid to flow into the firing chamber and to reestablish a continuous string or stream of liquid across the firing chamber, wherein liquid may once again flow across the firing chamber through the ports from the first portion to the second portion of the liquid conduit. In one implementation, the meniscus breaker may comprise a fluid actuator that displaces fluid to increase fluid pressure on at least one of the menisci so as to break the meniscus. In another implementation, the meniscus breaker may comprise a device that produces sufficient vibration to break at least one of the menisci.

In some implementations, the firing chamber may contain remnants of liquid following collapse of the bubble. Left unchecked, such remnants may reestablish a continuous string or stream a liquid across the firing chamber from one port to another port, inadvertently opening the valve. In such implementations, such valves may additionally comprise heaters that may be used to evaporate the liquid remnants between menisci across the ports. Such implementations, heaters may comprise thermal resistors. In other implementations, the same thermal resistor used to generate the bubble may be pulsed to generate heat so as to evaporate the liquid remnants between the menisci across the ports. In some implementations, the firing chamber may be circular or may have rounded or tapered corners and/or may include surfaces coated or formed from a liquid phobic material to further reduce the collection of remnant liquid during expulsion of the liquid by the bubble.

In some implementations, the liquid conduit comprises a microfluidic passage. Microfluidic passages may be formed by performing etching, microfabrication (e.g., photolithography), micromachining processes, or any combination thereof in a substrate of the fluidic die. Some example substrates may include silicon based substrates, glass based substrates, gallium arsenide based substrates, and/or other such suitable types of substrates for microfabricated devices and structures. Accordingly, microfluidic channels, passages, chambers, orifices, and/or other such features may be defined by surfaces fabricated in the substrate of a fluidic die. Furthermore, as used herein a microfluidic channel or passage may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

In some implementations, the liquid expelled from the firing chamber by the bubble is directed to a waste reservoir contained in a fluidic die that forms the firing chamber and the liquid conduit. In some implementations, the liquid expelled from the firing chamber by the bubble is directed to the first portion and/or the second portion of the liquid conduit, upstream or downstream from the firing chamber. In some implementations, the pump or a number of pumps, such as an inertial pump, may be utilized to move the expelled liquid to the waste reservoir or to one of the portions of the liquid conduit.

Figure 1:
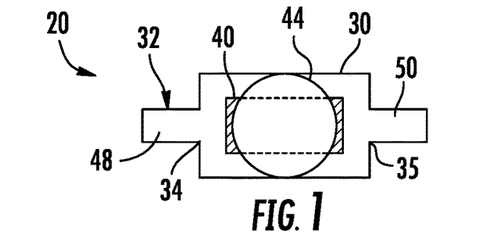
FIG. 1 is a schematic diagram of portions of an example microfluidic valve.

FIG. 1 schematically illustrates portions of an example microfluidic valve 20 in an open state in which liquid is permitted to flow through side of firing chamber 30 and across valve 20. Microfluidic valve 20 may be closed through the generation of a bubble to expel liquid through a firing chamber in the formation of menisci at ports leading into and out of the firing chamber. Microfluidic valve 20 comprises firing chamber 30, liquid conduit 32, ports 34, 35 and thermal resistor 40.

Firing chamber 30 comprises internal volume of a microfluidic die having an outlet or orifice 44. Firing chamber 30 is disposed between different portions of fluid conduit 32 to interrupt the flow of fluid through fluid conduit 32. Although schematically illustrated as rectangular, firing chamber 30 may have other sizes and shapes.

Conduit 32 comprises a microfluidic passage having different portions 48, 50 connected to the interior of firing chamber 30 by ports 34, 35, respectively. In the example illustrated, conduit 32 is a generally linear conduit, wherein portion 48 is connected to firing chamber 30 by port 34 on a first side of firing chamber 30 and wherein portion 50 is connected to firing chamber 30 by port 35 on a second opposite side of firing chamber 30. In the example illustrated, conduit 32 and its portions 48, 50 extend in a single plane, perpendicular to the direction in which orifice 44 opens. In other implementations, conduit 32 make extend in more than one dimension. For example, in other implementations, one of portions 48, 50 may extend in a plane different than that of the other of portions 48, 50. As will be described hereafter, in some implementations, conduit 32 may comprise multiple portions or segments that branch off from one another, leading in different directions from firing chamber 30 or coming into firing chamber 30 from different directions.

Ports 34 and 35 comprise openings in the side of firing chamber 30 for the entry or exit of liquid into and from firing chamber 30. Ports 34 and 35, sometimes referred to as capillaries, have dimensions smaller than the interior faces of firing chamber 30 in which the ports 34 and 35 pass through such that liquid menisci may form across ports 34 and 35. Ports 34 and 35 have levels of liquid flow resistance that are greater than the level of liquid flow resistance of orifice 44 such that firing of thermal resistor 40 expels a greater amount of liquid within firing chamber 30 through orifice 44 as compared to ports 34 and 35.

Thermal resistor 40 comprises an electrically resistive member or surface adjacent or proximate to the interior firing chamber 30. Thermal resistor 40, when conducting electrical current, generates a sufficient amount of heat to vaporize liquid within firing chamber 30 to create a bubble. The bubble moves liquid within firing chamber 30 through orifice 44, expelling liquid from firing chamber 30. The expulsion of the liquid from firing chamber 30 results in liquid menisci being formed across ports 34 and 35. Such menisci inhibit the reentry of liquid back into firing chamber 30, forming a capillary break between ports 34 and 35, closing microfluidic valve 20.

Figure 2:
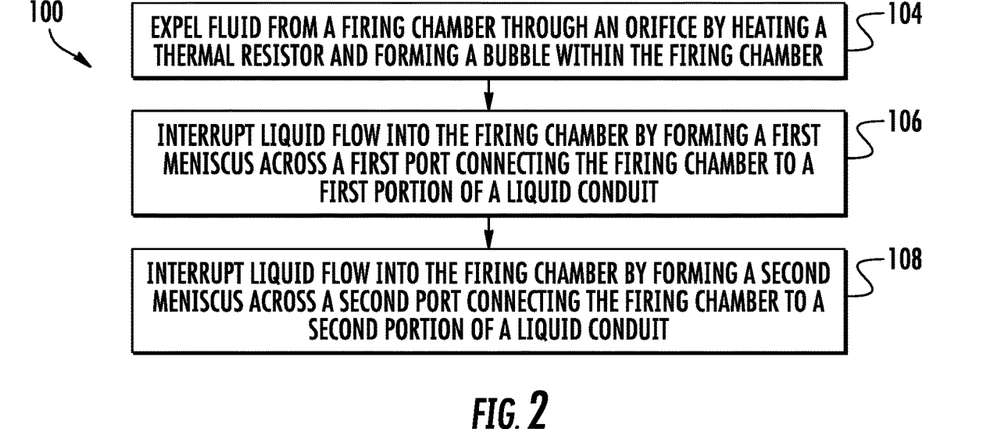
FIG. 2 is a flow diagram of an example method for closing an example microfluidic valve.
Figure 3:
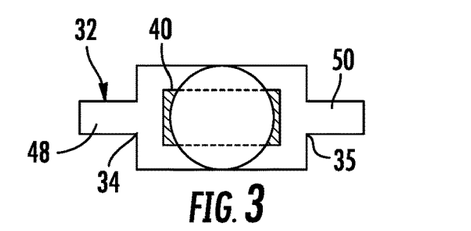
FIG. 3 is a schematic diagram of the example microfluidic valve of FIG. 1 during actuation of a thermal resistor.
Figure 4:
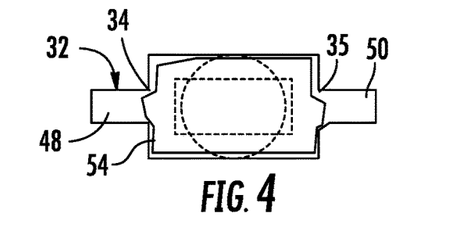
FIG. 4 is a schematic diagram of the microfluidic valve of FIG. 1 during expulsion of liquid by a bubble formed in a firing chamber of the microfluidic valve.

FIG. 2 is a flow diagram of an example method 100 for closing a microfluidic valve, such as microfluidic valve 20 described above. FIG. 3-5 illustrate method 100 being carried out with microfluidic valve 20. As indicated by block 104 and illustrated by FIGS. 3 and 4, thermal resistor 40 is heated so as to expel fluid from firing chamber 30 through orifice 44. As shown by FIG. 4, such heating forms a bubble 54 within firing chamber 30 which pushes and expels liquid through orifice 44 and somewhat back through ports 34 and 35, substantially emptying firing chamber 30.

Figure 5:
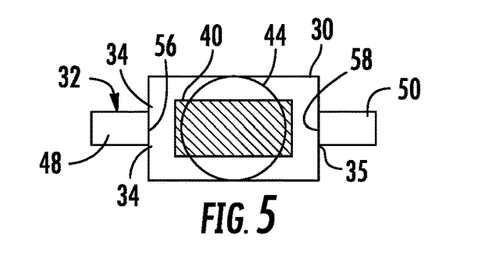
FIG. 5 is a schematic diagram of the microfluidic valve of FIG. 1 in a closed state, wherein menisci extending across ports forming capillary break.

As indicated by block 106 and illustrated by FIG. 5, subsequent collapse of bubble 54 forms a first liquid meniscus 56 across the port connecting firing chamber 30 to the first portion 48 of the liquid conduit 32, port 34, to interrupt liquid flow into firing chamber 30 through port 34. As indicated by block 108 and also illustrated by FIG. 5, the collapse of bubble 54 forms a second liquid meniscus 58 across the port connecting firing chamber 30 to the second portion 50 of the liquid conduit 32, port 35, to interrupt liquid flow into firing chamber 30 through port 35. Such menisci 56, 58 inhibit the reentry of liquid back into firing chamber 30, forming a capillary break between ports 34 and 35, closing microfluidic valve 20.

Figure 6:
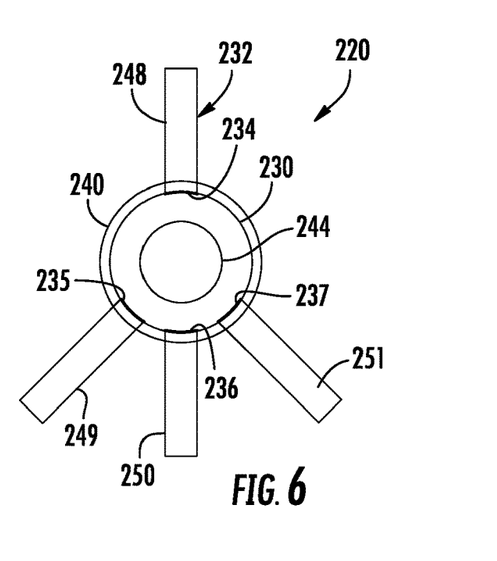
FIG. 6 is a schematic diagram of another example microfluidic valve.

FIG. 6 schematically illustrates portions of another example microfluidic valve 220. Like microfluidic valve 20, microfluidic valve 220 may be closed through the generation of a bubble to expel liquid through a firing chamber and the formation of menisci at ports leading into and out of the firing chamber. Microfluidic valve 220 comprises firing chamber 230, liquid conduit 232, ports 234, 235, 236, 237 and thermal resistor 240.

Firing chamber 230 is similar firing chamber 30 described above except that firing chamber 230 is cylindrical in shape. As a result, firing chamber 230 has a reduced number of corners where liquid may collect. Similar to firing chamber 230, firing chamber 230 comprises an orifice 244 through which liquid within firing chamber 230 may be expelled by the actuation of thermal resistor 240.

Liquid conduit 232 is similar liquid conduit 32 except that the liquid conduit 232 comprises four portions 248, 249, 250 and 251 connected to firing chambers 230 by ports 234, 235, 236 and 237, respectively. In one implementation, liquid flows into firing chamber 230 from a portion 248 and out of firing chamber 230 through at least one of portions 249, 250, 251. In other implementations, liquid flows into firing chamber 230 from at least one of portions 249, 250, 251 and out of firing chamber 230 through portion 248. In such an implementation, different liquids from different portions 249, 250 and 251 may mix within firing chamber 230 before exiting through portion 248. In yet other implementations, the liquid may flow into firing chamber 230 and exit from firing chamber 230 by any combination of the different portions 248, 249, 250 and 251. Although conduit 232 is illustrated as having four such portions, in other implementations, conduit 232 may comprise a greater or fewer of such portions, wherein each of such portions are connected to firing chamber 230 by respective ports.

Ports 234, 235, 236 and 237 are similar to ports 34 and 35 described above. Ports 234, 235, 236 and 237 comprise openings in firing chamber 230 for the entry or exit of liquid into and from firing chamber 230. Ports 234, 235, 236 and 237, sometimes referred to as capillaries, have dimensions smaller than the interior faces of firing chamber 230 in which such ports pass through such that liquid menisci may form across such ports. Ports 234, 235, 236 and 237 have levels of liquid flow resistance that are greater than the level of liquid flow resistance of orifice 244 such that firing of thermal resistor 240 expels a greater amount of liquid within firing chamber 230 through orifice 244 as compared to ports 234, 235, 236 and 237.

Thermal resistor 240 is similar to thermal resistor 40 described above except that thermal resistor 240 is circular in shape and is larger than firing chamber 230, extending beyond the perimeter of firing chamber 230. As a result, thermal resistor 240 is more likely to completely exhaust or expel liquid from within firing chamber 230 when valve 220 is being closed.

Microfluidic valve 220 is closed in a manner similar to the closing of microfluidic valve 20. Microfluidic valve 220 may be closed in accordance with method 100 described above. Thermal resistor 240, when conducting electrical current, generates a sufficient amount of heat to vaporize liquid within firing chamber 230 to create a bubble. The bubble moves liquid within firing chamber 230 through orifice 244, expelling liquid from firing chamber 230. The expulsion of the liquid from firing chamber 230 results in liquid menisci being formed across ports 234, 235, 236 and 237. Such menisci inhibit the reentry of liquid back into firing chamber 230, forming a capillary break between ports 234, 235, 236 and 237, closing microfluidic valve 220.

Figure 7:
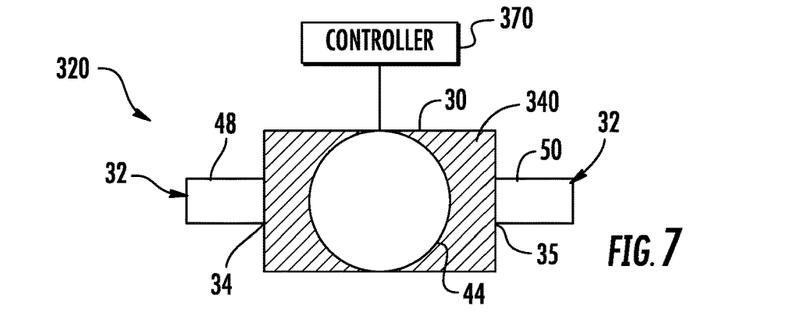
FIG. 7 is a schematic diagram of another example microfluidic valve

In some circumstances, the firing chamber may contain remnants of liquid following collapse of the bubble. Left unchecked, such remnants may reestablish a continuous string or stream a liquid across the firing chamber from one port to another port, inadvertently opening the valve. FIG. 7 schematically illustrates portions of another example microfluidic valve 320 that facilitates the removal or reduction of such liquid remnants between the menisci to inhibit inadvertent opening of microfluidic valve 320.

Microfluidic valve 320 is similar microfluidic valve 20 described above except a microfluidic valve 320 comprises a thermal resistor 340 which is under the control of controller 370. Those remaining components of microfluidic valve 320 which correspond to components of microfluidic valve 20 are numbered similarly.

Thermal resistor 340 is similar to thermal resistor 40 described above except thermal resistor 340 is sized so as to extend across a majority if not all of the interior volume of firing chamber 30, opposite to orifice 44. As a result, the bubble created by thermal resistor 340 is more likely to completely expel liquid from firing chamber 30 through orifice 44.

Controller 370 further assists in the complete expulsion of liquid from firing chamber 30 by utilizing thermal resistor 340 as a heater following the creation of the bubble that expels a majority of the liquid from firing chamber 30. Controller 370 may comprise an integrated circuit or a processing unit that follows instructions contained in a non-transitory computer readable medium to pulse thermal resistor 340, evaporating or spraying any remnant liquid within firing chamber 30 between the menisci formed across ports 34 and 35.

Figure 8:
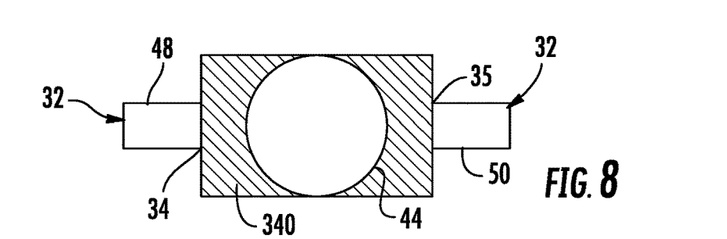
FIG. 8 is a schematic diagram of the microfluidic valve of FIG. 7 during actuation of a thermal resistor.
Figure 9:
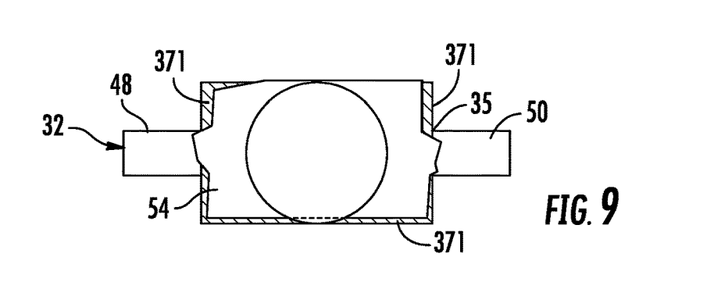
FIG. 9 is a schematic diagram of the microfluidic valve of FIG. 7 during expulsion of liquid by a bubble formed in a firing chamber of the microfluidic valve.

FIGS. 8-11 illustrate the closing of microfluidic valve 320. As illustrated by FIGS. 8 and 9, thermal resistor 340 is heated so as to expel fluid from firing chamber 30 through orifice 44. As shown by FIG. 9, such heating forms a bubble 54 within firing chamber 30 which pushes and expels liquid through orifice 44 and somewhat back through ports 34 and 35, substantially emptying firing chamber 30, leaving liquid remnants 371 along the perimeter of the interior of firing chamber 30.

Figure 10:
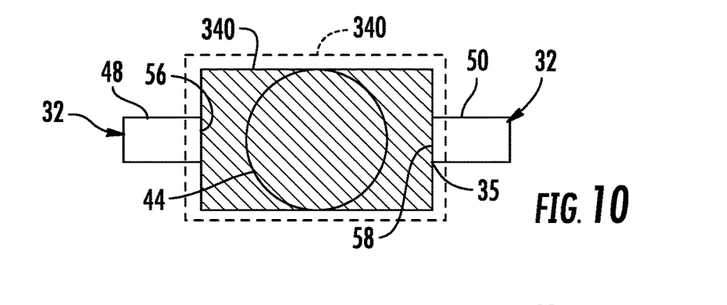
FIG. 10 is a schematic diagram of the example microfluidic valve of FIG. 7 during the application of supplemental heat to evaporate or spray liquid remnants within a firing chamber of the microfluidic valve between menisci extending across ports of the microfluidic valve.

As illustrated by FIG. 10, subsequent collapse of bubble 54 forms a first liquid meniscus 56 across the port connecting firing chamber 30 to the first portion 48 of the liquid conduit 32, port 34, to interrupt liquid flow into firing chamber 30 through port 34. As also illustrated by FIG. 10, the collapse of bubble 54 forms a second liquid meniscus 58 across the port connecting firing chamber 30 to the second portion 50 of the liquid conduit 32, port 35, to interrupt liquid flow into firing chamber 30 through port 35. Such menisci 56, 58 inhibit the reentry of liquid back into firing chamber 30, forming a capillary break between ports 34 and 35, closing microfluidic valve 20. As shown by broken lines in FIG. 10, in other implementations, thermal resistor 340 may have dimensions greater than dimensions of the interior of firing chamber 342 further assist in a more complete expulsion of liquid within firing chamber 30 by the generated bubble.

Figure 11:
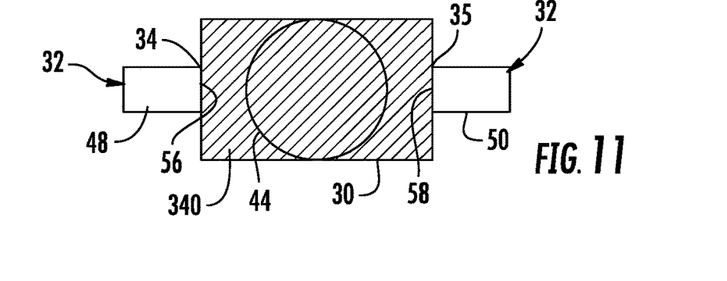
FIG. 11 is a schematic diagram of the microfluidic valve of FIG. 7 in a closed state, wherein the menisci form a capillary break.

As further illustrated by FIG. 10, thermal resistor 340 is once again actuated or pulsed by controller 370 to generate heat to have to evaporate or spray the liquid remnants 371 (shown in FIG. 9). As shown by FIG. 11, following such evaporation or spraying of remnants 371, the interior of firing chamber 30 has little or no remaining liquid remnants that might inadvertently break the menisci 56, 58 and inadvertently open valve 320.

Figure 12:
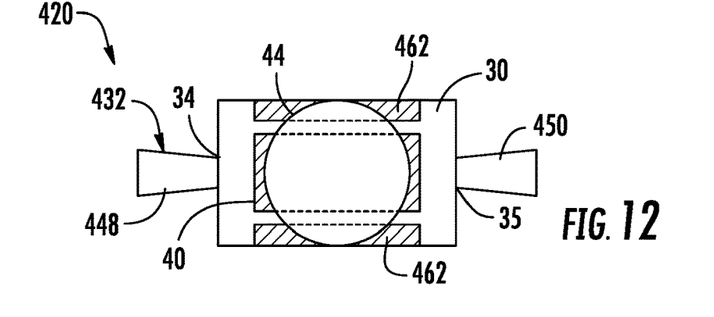
FIG. 12 is a schematic diagram of another example microfluidic valve

FIG. 12 schematically illustrates portions of another example microfluidic valve 420. Microfluidic valve 420 is similar to microfluidic valve 20 described above except the microfluidic valve 420 comprises fluid conduit 432 in place of fluid conduit 32 and additionally comprises auxiliary heaters 462. Those remaining components of microfluidic valve 420 which correspond to components of microfluidic valve 20 are numbered similarly.

Conduit 432 is similar to conduit 32 except that conduit 432 comprises portions 448 and 450 that taper or narrow towards ports 34 and 35, respectively. Such constrictions formed at ports 34 and 35 facilitate the forming of the menisci during closing of microfluidic valve 420. In other implementations, microfluidic valve 420 may comprise conduit 32 or conduit 232 described above.

Auxiliary heaters 462 comprise devices within or adjacent firing chamber 30 so as to assist in removing or reducing the amount of remnant liquid within firing chamber 30 following the formation of menisci across ports 34, 36. In the example illustrated, auxiliary heaters 462 comprise thermal resistors that, when conducting electrical current, output a sufficient amount of heat so as to evaporate liquid remnants within firing chamber 30. In the example illustrated, of auxiliary heaters 462 extend along opposite side surfaces of firing chamber 30, wherein port 34, 35 are located between such opposite side surfaces. In other implementations, auxiliary heaters 462 may be provided at other locations along or within firing chamber 30.

Figure 13:
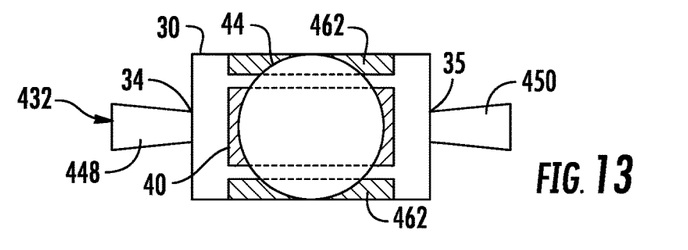
FIG. 13 is a schematic diagram of the microfluidic valve of FIG. 12 during actuation of a thermal resistor.
Figure 14:
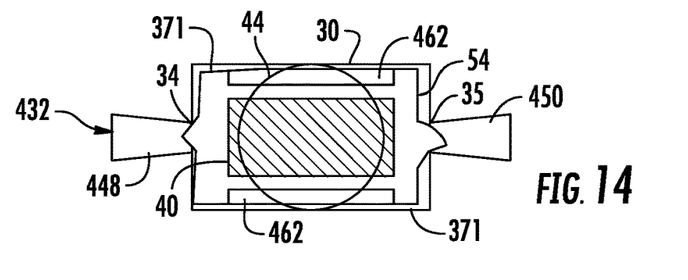
FIG. 14 is a schematic diagram of the microfluidic valve of FIG. 12 during expulsion of liquid by a bubble formed in a firing chamber of the microfluidic valve.

FIGS. 13-16 illustrate the closing of microfluidic valve 420. As illustrated by FIGS. 13 and 14, thermal resistor 40 is heated so as to expel fluid from firing chamber 30 through orifice 44. As shown by FIG. 14, such heating forms a bubble 54 within firing chamber 30 which pushes and expels liquid through orifice 44 and somewhat back through ports 34 and 35, substantially emptying firing chamber 30, leaving liquid remnants 371 along the perimeter of the interior of firing chamber 30.

Figure 15:
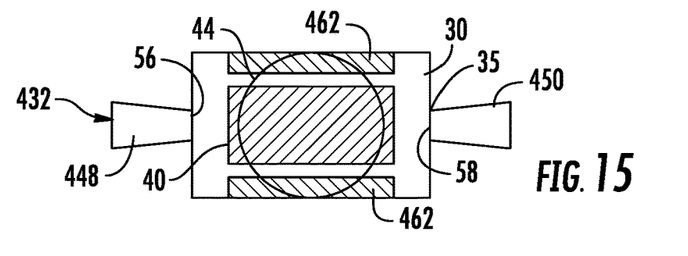
FIG. 15 is a schematic diagram of the example microfluidic valve of FIG. 12 during the application of supplemental heat to evaporate or spray liquid remnants within a firing chamber of the microfluidic valve between menisci extending across ports of the microfluidic valve.

As illustrated by FIG. 15, subsequent collapse of bubble 54 forms a first liquid meniscus 56 across the port connecting firing chamber 30 to the first portion 48 of the liquid conduit 32, port 34, to interrupt liquid flow into firing chamber 30 through port 34. As also illustrated by FIG. 10, the collapse of bubble 54 forms a second liquid meniscus 58 across the port connecting firing chamber 30 to the second portion 50 of the liquid conduit 32, port 35, to interrupt liquid flow into firing chamber 30 through port 35. Such menisci 56, 58 inhibit the reentry of liquid back into firing chamber 30, forming a capillary break between ports 34 and 35, closing microfluidic valve 20.

Figure 16:
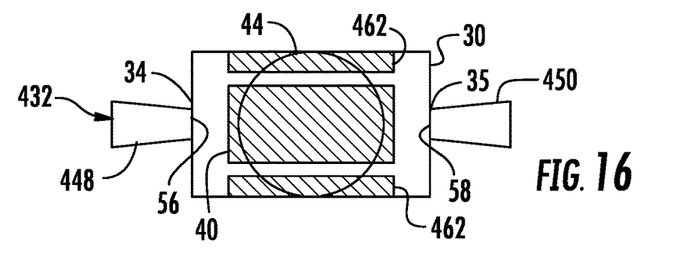
FIG. 16 is a schematic diagram of the microfluidic valve of FIG. 12 in a closed state, wherein the menisci form a capillary break.

As further illustrated by FIG. 15, controller 370 (shown in FIG. 7), is electrically connected to thermal resistor 40 as well as auxiliary heaters 462, and outputs control signals actuating auxiliary heaters 462 to generate heat so as to evaporate or spray the liquid remnants 371 (shown in FIG. 14). As shown by FIG. 16, following such evaporation or spraying of remnants 371, the interior of firing chamber 30 has little or no remaining liquid remnants that might inadvertently break the menisci 56, 58 and inadvertently open valve 420.

Figure 17:
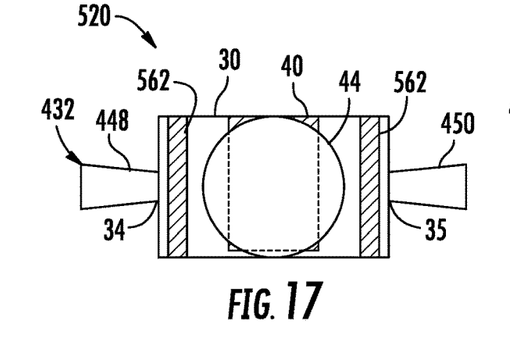
FIG. 17 is a schematic diagram of an example microfluidic valve.
Figure 18:
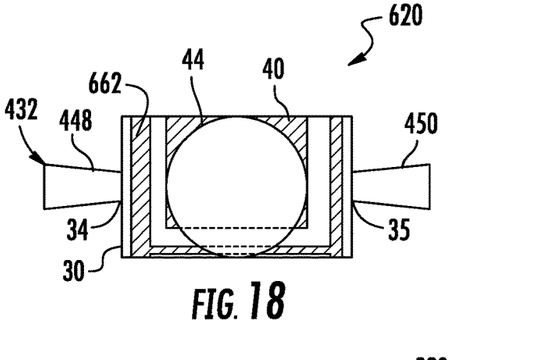
FIG. 18 is a schematic diagram of an example microfluidic valve.

FIGS. 17 and 18 illustrate other example microfluidic valves having different auxiliary heaters. FIG. 17 schematically illustrates portions of an example microfluidic valve 520. Microfluidic valve 520 is similar to microfluidic valve 420 described above except that microfluidic valve 520 comprise auxiliary heaters 562 in place of auxiliary heaters 462. Auxiliary heaters 562 extend adjacent or within firing chamber 30 across ports 34 and 36. Auxiliary heaters 562 output heat to evaporate or spray any liquid remnants that may be proximate to the menisci formed across ports 34 and 35, inhibiting such liquid remnants from contacting such menisci and potentially breaking such menisci to inadvertently open fluidic valve 520. Liquid remnants remaining between heaters 562 is inhibited from contacting such menisci and inadvertently opening valve 520.

FIG. 18 schematically illustrates portions of another example microfluidic valve 620. Microfluidic valve 620 is similar to microfluidic valve before 20 described above except a microfluidic valve 620 comprises auxiliary heater 662 in place of auxiliary heaters 562. Auxiliary heater 662 extends within or adjacent to firing chamber 30 across ports 34, 35 and along at least one side of firing chamber 30. In one implementation, auxiliary heater 662 comprise a single thermal resistor that heats at least three perimeter side surfaces of the interior of firing chamber 30 to evaporate or spray any liquid remnants within chamber 30 between the menisci that are formed across ports 34 and 35 when valve 620 is closed.

Figure 19:
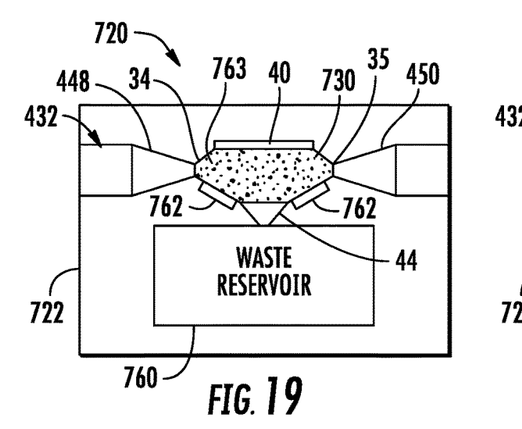
FIG. 19 is a side sectional view illustrating portions of an example microfluidic valve.

FIG. 19 is a side sectional view of an example microfluidic valve 720. Like microfluidic valve 420, microfluidic valve 720 may be closed through the generation of a bubble to expel liquid through a firing chamber in the formation of menisci at ports leading into and out of the firing chamber. Microfluidic valve 720 is formed in a fluidic die 722 and comprises firing chamber 730, liquid conduit 432, ports 34, 36, thermal resistor 40, waste reservoir 760 and auxiliary heaters 762.

Firing chamber 730 is similar to firing chamber 30 described above except that firing chamber 730 has internally sloped floors and tapered internal sides that reduce the existence of corners where liquid remnants may collect or reside during the expulsion of liquid by the bubble generated by thermal resistor 40 during the closing of valve 720. To further facilitate the more complete expulsion of liquid from firing chamber 730 by the bubble generated by thermal resistor 40, interior surfaces of firing chamber 730 are coated or formed from a liquid phobic material 763, such as a hydrophobic material. In one implementation, the liquid phobic material is located just in the corners where liquid remnants residuals may collect. In another implementation, liquid phobic material covers a majority if not all of the interior surface of firing chamber 730. Examples of a liquid phobic material include, but are not limited to, polytetrafluoroethylene. In other implementations, liquid phobic material 763 may be omitted. In other implementations, firing chamber 730 may have other shapes, with or without liquid phobic material 763.

Waste reservoir 760 comprises an internal chamber within fluidic die 722 that is to receive and store liquid expelled from firing chamber 730 during the closing of microfluidic valve 720. In some implementations, waste reservoir 760 may comprise an access opening through which waste reservoir 760 may be emptied.

Auxiliary heaters 762 are similar to auxiliary heaters 462 described above. Auxiliary heater 762 are actuated by controller, such as controller 370 shown in FIG. 7, so as to evaporate or spray any remaining liquid remnants within firing chamber 730. Auxiliary heaters 762 reduce the likelihood of such liquid remnants inadvertently making contact with the formed menisci and inadvertently opening microfluidic valve 720.

Figure 20:
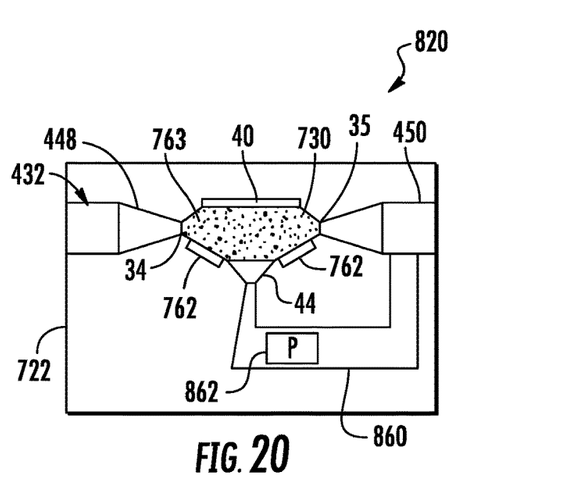
FIG. 20 is a side sectional view illustrating portions of an example microfluidic valve.

FIG. 20 schematically illustrates portions of another example microfluidic valve 820. Microfluidic valve 820 is similar to microfluidic valve 720 described above except that microfluidic valve 820 comprises microfluidic passage 860 and pump 862. Those remaining components of microfluidic valve 820 which correspond to components or elements of microfluidic valve 720 are numbered similarly.

Microfluidic passage 860 comprises a channel form within fluidic die 722 that directs liquid expelled through orifice 44 to conduit 432. In the example illustrated, microfluidic passage 860 directs expelled liquid to portion 450 of conduit 432. In other implementations, microfluidic passage 860 directs expelled liquid to portion 448 of conduit 432.

Pump 862 comprise a device to pump and move the expelled liquid along path 860 to portion 450 of conduit 432. In one implementation, pump 862 comprise an inertial pump. In one implementation, pump 862 comprise a thermal resistor, under the control of a controller, such as controller 370, wherein the thermal resistor crates a bubble which moves liquid along passage 860 to portion 450 (or to portion 448 in some implementations). In some implementations, pump 862 may be omitted, wherein the force of the liquid being expelled through orifice 44 a moves liquid within passage 860.

Figure 21:
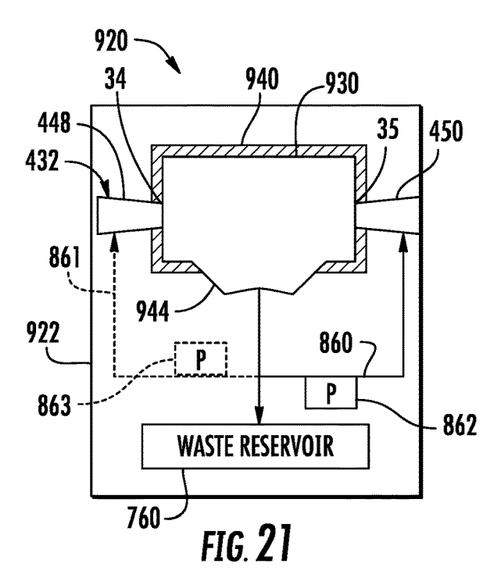
FIG. 21 is a schematic diagram of an example microfluidic valve.

FIG. 21 schematically illustrates portions of another example microfluidic valve 920. Like microfluidic valve 320, microfluidic valve 920 may be closed through the generation of a bubble to expel liquid through a firing chamber in the formation of menisci at ports leading into and out of the firing chamber. Microfluidic valve 920 is formed in a fluidic die 922 and comprises firing chamber 930, liquid conduit 32, ports 34, 36, thermal resistor 940, waste reservoir 760, microfluidic passage 860 and pump 862. Liquid conduit 32, ports 34, 36, waste reservoir 760, microfluidic passage 860 and pump 862 are described above.

Firing chamber 930 is similar firing chamber 30 described above except that firing chamber 930 comprises orifice 944. Orifice 944 is coplanar with ports 34 and 36. Orifice 944 forms an opening for firing chamber 930 that is less resistance to liquid flow as compared to that of ports 34 and 36.

Thermal resistor 940 is similar to thermal resistor 40 except a thermal resistor 940 extends outwardly beyond the perimeter of the interior of firing chamber 930. As a result, thermal resistor 940 may more completely expel liquid within firing chamber 930, leaving less liquid remnants in the corners or along the interior perimeter of firing chamber 930. In other implementations, thermal resistor 40 may be similar to thermal resistor 40 described above. In yet other implementations, microfluidic valve 920 may comprise auxiliary heaters, such as auxiliary heaters 462, 562 are 662 described above.

In the example illustrated, the liquid expelled by the bubble during closing of microfluidic valve 920 may flow to either waste reservoir 760 or to portion 450 of conduit 432 via microfluidic passage 860. In one implementation, the expelled liquid flows to both. In another implementation, control over where the expelled liquid goes may be facilitated through the actuation of pump 862. As shown by broken lines, in other implementations, the liquid expelled through orifice 944 by the generated bubble during the closing of microfluidic valve 920 may additionally or alternatively be directed back to portion 448 of conduit 432 by microfluidic passage 861. In such an implementation, a pump 863 may move the liquid along passage 861. Actuation of pump 863 may further facilitate the direction which the liquid expelled through orifice 944 moves, either to waste reservoir 760 or to portion 448 of conduit 432. In some implementations, passage 860 and pump 862, passage 61 and pump 863 and/or reservoir 760 may be omitted.

Figure 22:
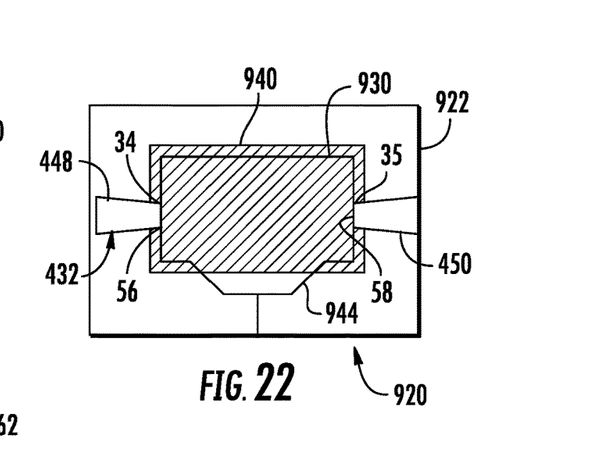
FIG. 22 is a schematic diagram of the microfluidic valve of FIG. 21 in a closed state.

FIG. 22 illustrates the closing of microfluidic valve 920. FIG. 22 illustrates firing chamber 930 following the expulsion of liquid by the generation of a bubble formed by thermal resistor 940. As shown by FIG. 22, following collapse of the bubble, menisci 56, 58 form across ports 34, 35, respectively, to inhibit liquid from flowing back into firing chamber 930 and to maintain a capillary break between ports 34 and 36, closing microfluidic valve 920.

Figure 23:
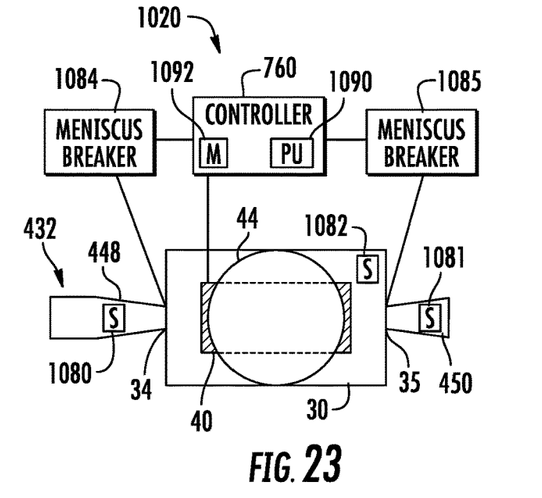
FIG. 23 is a schematic diagram of an example microfluidic valve.

FIG. 23 schematically illustrates portions of microfluidic valve 1020. Microfluidic valve 1020 is similar to microfluidic valve 20 and 420 described above except that microfluidic valve 1020 is illustrated as additionally comprising componentry to open valve 1020 after it has been closed. It should be appreciated that any of the microfluidic valves described above and below may also include the componentry illustrated in FIG. 23 for selectively opening such microfluidic valves after they have been closed. Microfluidic valve 1020 additionally comprises sensors 1080, 1081 and 1082, meniscus breakers 1084, 1085 and controller 760. Those components of microfluidic valve 1020 which correspond to components of microfluidic valve 20 are valve for 20 are numbered similarly.

Sensors 1080, 1081 and 1082 sense the flow of liquid. In one implementation, such sensors may comprise impedance sensors. Sensor 1080 senses the flow of liquid within portion 448 of conduit 432. Sensor 1081 senses a flow of liquid within portion 450 of conduit 432. Sensor 1082 sense the flow of liquid through and across firing chamber 30.

Meniscus breakers 1084, 1085 comprise devices that, upon being actuated by controller 760, break the menisci extending across ports 34 and 35 in maintaining valve 1020 in a closed state. In one implementation, each of meniscus breakers 1084, 1085 may comprise a liquid pump, such as an inertial pump that increases the pressure of the adjacent liquid to a sufficient extent so as to break the corresponding meniscus extending across port 34 or port 36. In one implementation, each of meniscus breakers 1084, 1085 comprises a thermal resistor that vaporizes the adjacent fluid to create a bubble that displaces adjacent liquid to break the corresponding meniscus. In other implementations, meniscus breakers 1084, 1085 may comprise micro-electromechanical systems that vibrate to a sufficient extent so as to break the adjacent meniscus. Although valve 1020 is illustrated as comprising a meniscus breaker 1084, 1085 for each of ports 34, 36, in other implementations, a single meniscus breaker, upstream of firing chamber 30 may be utilized, wherein once the upstream meniscus has been broken, the pressure of the downstream flow of liquid will contact and break the downstream meniscus on the downstream port.

Controller 760 comprise a processing unit 1090 that follows instructions contained in a non-transitory computer-readable medium or memory 1092. Controller 760 controls the actuation of thermal resistor 40 as well as the actuation of meniscus breakers 1084, 1085. In one implementation, controller 760 actuates the resistor 40 as well as meniscus breakers 1084, 1085 based upon signals received from sensors 1080, 1081 and/or 1082. For example, when 1020 is to be opened, controller 760 may actuate meniscus breakers 1084 and/or 1085 until liquid flow is sensed by such sensors. By way of another example, upon receiving signals indicating the flow of liquid across firing chamber 30 has been stopped, controller 760 may output control signals pulsing thermal resistor 42 further sprayer evaporate any remaining liquid remnants in firing chamber 30. In some implementations, sensor 1082 may comprise an optical sensor or other sensor that senses the presence of liquid remnants, wherein controller 760 may actuate or pulse thermal resistor 42 evaporate such remaining liquid remnants. In other implementations, sensors 1080, 1081 and 1082 may be omitted.

Figure 24:
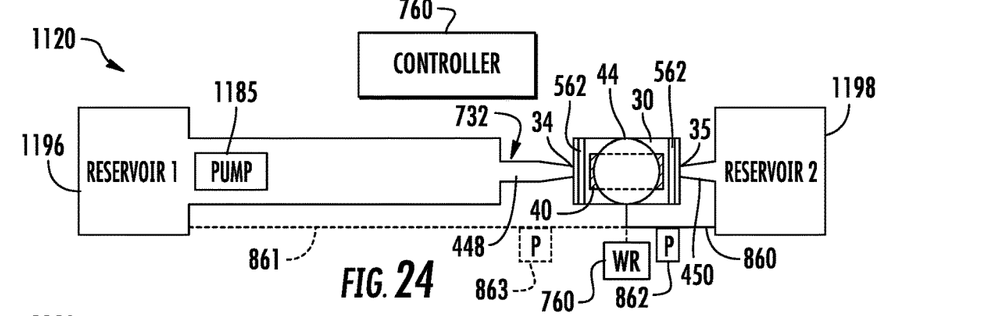
FIG. 24 is a schematic diagram of an example microfluidic valve.

FIG. 24 schematically illustrates portions of an example microfluidic valve 1120. Microfluidic valve 1120 is similar to microfluidic valves 520, 920 and 1020 described above except that microfluidic valve 1120 is specifically illustrated as comprising a single meniscus breaker 1185 in the form of a liquid pump. In addition, conduit 432 is illustrated as connecting liquid reservoirs 1196 and 1198. Those components of microfluidic valve 1120 which correspond to components of the 520, 920 or 1020 are numbered similarly.

Meniscus breaker 1185 comprises a liquid pump that moves liquid within conduit 432 towards firing chamber 30 and towards reservoir. In one of limitation, meniscus breaker 1185 comprise an inertial pump. In one implementation, meniscus breaker 1185 comprises a thermal resistor that, when conducting electric current, generate sufficient heat to vaporize adjacent fluid and create a bubble that drives adjacent liquid along conduit 432. In another implementation, meniscus breaker 1185 may comprise other fluid actuators that displace liquid such as a piezoelectric membrane based actuator, an electrostatic membrane actuator, a mechanical/impact driven membrane actuator, a magnetostrictive drive actuator, or other such elements that may cause displacement of fluid responsive to electrical actuation.

Figure 25:
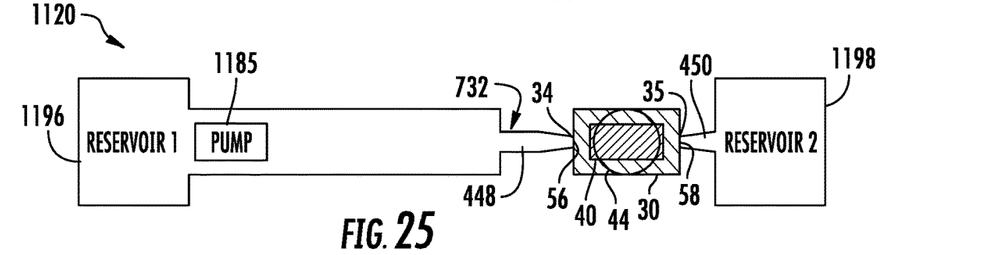
FIG. 25 is a schematic diagram of the example microfluidic valve of FIG. 24 in a closed state.
Figure 26:
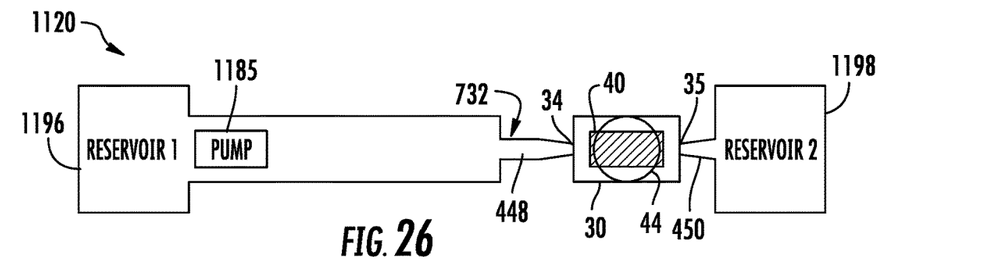
FIG. 26 is a schematic diagram of the example microfluidic valve of FIG. 24 in an open state.

FIGS. 25 and 26 illustrate valve 1120 in a closed state and in an open state, respectively. For ease of illustration, some components of microfluidic valve 1120 are omitted in FIGS. 25 and 26. FIG. 25 illustrates microfluidic valve 1120 in a closed state, inhibiting the flow of liquid from portion 448 of conduit 432 across firing chamber 30 to portion 450 and reservoir 1198. FIG. 25 illustrates valve 1120 after controller 760 has actuated thermal resistor 40 so as to generate heat to form a bubble within firing chamber 30, wherein the bubble expels liquid within firing chamber 30 into either waste reservoir 760, to portion 450 of conduit 730 or to portion 448 of conduit 432. FIG. 25 further illustrates valve 1120 after controller 760 has actuated auxiliary heaters 562 to evaporate or spray any remaining liquid remnants within firing chamber 30 such that menisci 56, 58 extending across ports 34 and 35 inhibit the flow of liquid into firing chamber 30, forming a capillary break between ports 34 and 36.

FIG. 26 illustrates valve 1120 after being opened by meniscus breaker 1185. FIG. 26 illustrates valve 1120 after the pump serving as meniscus breaker 1185 has displaced fluid and increase the pressure of fluid within portion 448 so as to break the meniscus 56. Liquid being driven by the pump flows into firing chamber 30, breaking meniscus 58, establishing a complete continuous stream of fluid across firing chamber 30, wherein the liquid may flow into reservoir 1198.

Figure 27:
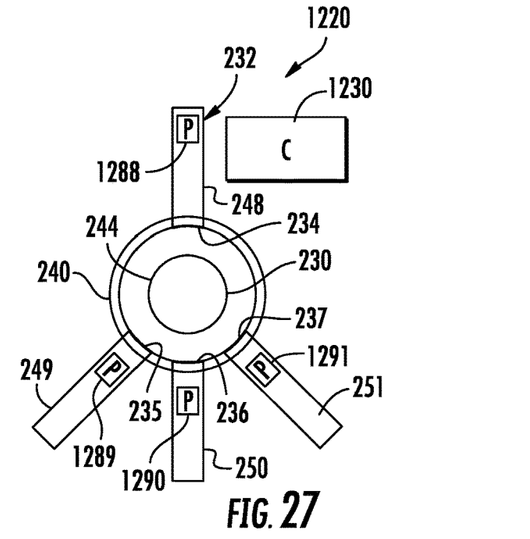
FIG. 27 is a schematic diagram illustrating portions of an example microfluidic valve.

FIG. 27 schematically illustrates portions of an example microfluidic valve 1220. Microfluidic valve 1220 is similar to microfluidic valve 220 described above except that microfluidic valve 1220 additionally comprises pumps 1288, 1289, 1290 and 1291 within or proximate to portions 248, 249, 250 and 251, respectively, of conduit 232. Those remaining components of valve 1220 which correspond to components of valve 220 are numbered similarly. As should be appreciated, microfluidic fluidic valve 1220 may additionally comprise auxiliary heaters 462, 562, 662 as described above and/or waste reservoir 760/microfluidic passage 860, 861 described above. Each of such passages 860, 861 may be additionally provided with pumps 862, 863 as described above. In some implementations, firing chamber 230 maybe shape similar to firing chamber 730 described above and/or maybe coded are formed from a liquid phobic material 763 as described above.

Pumps 1288, 1289, 1290 and 1291 are similar to the pump that forms meniscus breaker 1185 in valve 1120 in that said pumps are to drive fluid as well as selectively break their respective meniscus upon being actuated by controller 1230. As with the pump forming meniscus breaker 1185, pumps1288, 1289, 1290 and 1291 may each comprise a piezoelectric membrane based actuator, a thermal resistor based actuator, an electrostatic membrane actuator, a mechanical/impact driven membrane actuator, a magnetostrictive drive actuator, or other such elements that may cause displacement of fluid responsive to electrical actuation.

In one implementation, when microfluidic valve 1220 is in a closed state, controller 760 may selectively actuate different combinations of the pumps 1288, 1289, 1290 and 1291 to control the direction of liquid flow across valve 1220. For example, controller 760 may actuate pumps 1288 and 1289 such that a greater proportion of liquid flows through portion 249 of conduits 232. In some implementations, controller 1230 may control the frequency or other aspects of the different pumps differently to control what percentage of the liquid entering firing chamber 230 from portion 248 flows into each of portions 249, 250 and 251.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic valve comprising:
   a firing chamber having an orifice;
   a first portion of a liquid conduit connected to the firing chamber at a first port;
   a second portion of the liquid conduit connected to the firing chamber at a second port, wherein the orifice is a separate fluidic path from the first port and the second port; and
   a thermal resistor to form a bubble with the firing chamber to expel liquid from the firing chamber through the orifice such that a first meniscus forms across the first port upon collapse of the bubble and a second meniscus forms across the second port upon collapse of the bubble to interrupt liquid flow between the first portion and the second portion of the liquid conduit.

2. The microfluidic valve of claim 1 further comprising a heater approximate the firing chamber to evaporate remaining liquid between the first meniscus and the second meniscus.

3. The microfluidic valve of claim 2, wherein the heater comprises a second thermal resistor.

4. The microfluidic valve of claim 3, wherein the second thermal resistor extends along opposite sides of the firing chamber.

5. The microfluidic valve of claim 3, wherein the second thermal resistor extends within the firing chamber across the first port.

6. The microfluidic valve of claim 3, wherein:
   the second thermal resistor is within the firing chamber; and
   extends along three perimeter side surfaces of an interior of the firing chamber.

7. The microfluidic valve of claim 3, wherein the second thermal resistor is within the firing chamber and extends across the first port and second port.

8. The microfluidic valve of claim 2, wherein:
   the thermal resistor is disposed on top of the firing chamber;
   the heater is disposed on bottom of the firing chamber; and a discharge reservoir connected to the orifice is below the firing chamber.

9. The microfluidic valve of claim 1 further comprising a discharge reservoir connected to the orifice to receive liquid ejected through the orifice.

10. The microfluidic valve of claim 1 further comprising a recirculation passage connected to the orifice to receive liquid ejected through the orifice and to direct liquid to one of the first portion and the second portion of the liquid conduit.

11. The microfluidic valve of claim 1, wherein the first portion of the liquid conduit tapers to the first port.

12. The microfluidic valve of claim 1, wherein the thermal resistor is larger than the firing chamber.

13. A method comprising:
closing a microfluidic valve by:
expelling fluid from a firing chamber through an orifice by heating a thermal resistor and forming a bubble within the firing chamber;
interrupting liquid flow into the firing chamber by forming a first meniscus across a first port connecting the firing chamber to a first portion of a liquid conduit upon collapse of the bubble within the firing chamber; and
interrupting liquid flow into the firing chamber by forming a second meniscus across a second port connecting the firing chamber to a second portion of a liquid conduit upon collapse of the bubble within the firing chamber.

14. The method of claim 13 further comprising receiving liquid expelled through the orifice with a discharge reservoir.

15. The method of claim 13 further comprising recirculating the liquid expelled to the orifice to one of the first portion and the second portion of the liquid conduit.

16. The method of claim 13 further comprising opening the microfluidic valve by pumping the fluid to break the first capillary meniscus which will cause liquid to flow and break the second meniscus to provide liquid flow across the firing chamber between the first portion of the liquid conduit and the second portion of the liquid conduit.

17. The method of claim 13, further comprising pulsing the thermal resistor to generate heat to evaporate remaining liquid between the first meniscus and the second meniscus.

18. A microfluidic system comprising:
a microfluidic valve comprising:
a firing chamber having an orifice;
a first portion of a liquid conduit connected to the firing chamber at a first port;
a second portion of the liquid conduit connected to the firing chamber at a second port, wherein the orifice:
is a separate fluidic path from the first port and the second port;
has less resistance to liquid flow as compared to the first port and the second port; and
is in a plane perpendicular to a plane of the first portion and the second portion of the liquid conduit; and
a thermal resistor proximate the firing chamber, wherein the thermal resistor is on a wall opposite the orifice;
a meniscus breaker to break menisci formed across the first and second ports; and
a controller to selectively:
close the microfluidic valve by powering the thermal resistor to form a bubble with the firing chamber to expel liquid from the firing chamber through the orifice such that a first meniscus forms across the first port upon collapse of the bubble and a second meniscus forms across the second port upon collapse of the bubble to interrupt liquid flow between the first portion and the second portion of the liquid conduit; and
to open the microfluidic valve by actuating the meniscus breaker to break the first meniscus and the second meniscus to connect liquid within the first portion to liquid within the second portion of the liquid conduit.

19. The microfluidic system of claim 18 further comprising a sensor to liquid flow across the firing chamber, wherein the controller powers at least one of the thermal resistor and the meniscus breaker based upon signals from the sensor.

20. The microfluidic system of claim 18, wherein the meniscus breaker comprises a fluid actuator to displace fluid to increase fluid pressure on at least one of the first meniscus or the second meniscus.

* * * * *